Dec. 19, 1967  W. B. GIST, JR  3,358,441
EFFICIENT PART POWER GAS TURBINE POWERPLANT
Filed July 11, 1966  2 Sheets-Sheet 1
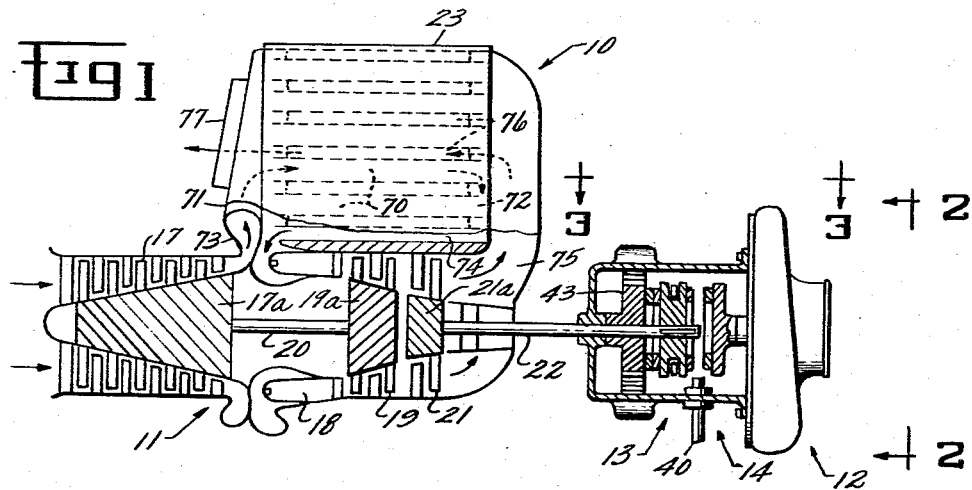
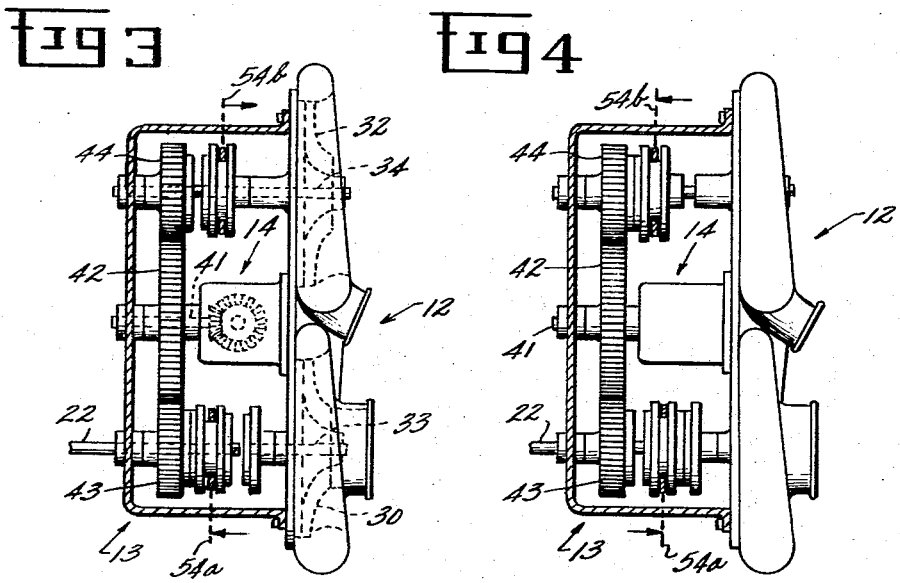
INVENTOR.
WILLIAM B. GIST, JR.
BY
George R. Powers
ATTORNEY—

Dec. 19, 1967     W. B. GIST, JR     3,358,441
EFFICIENT PART POWER GAS TURBINE POWERPLANT
Filed July 11, 1966     2 Sheets-Sheet 2
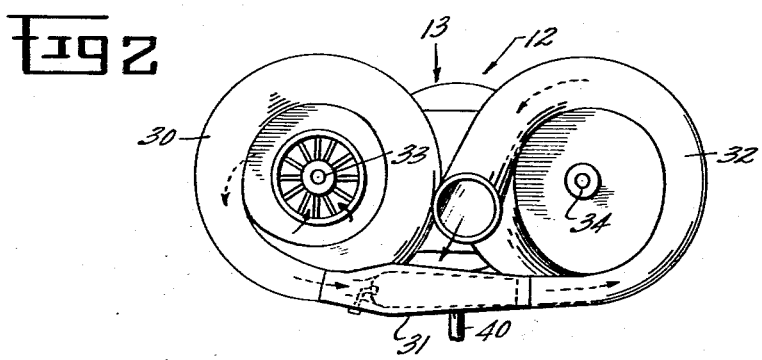
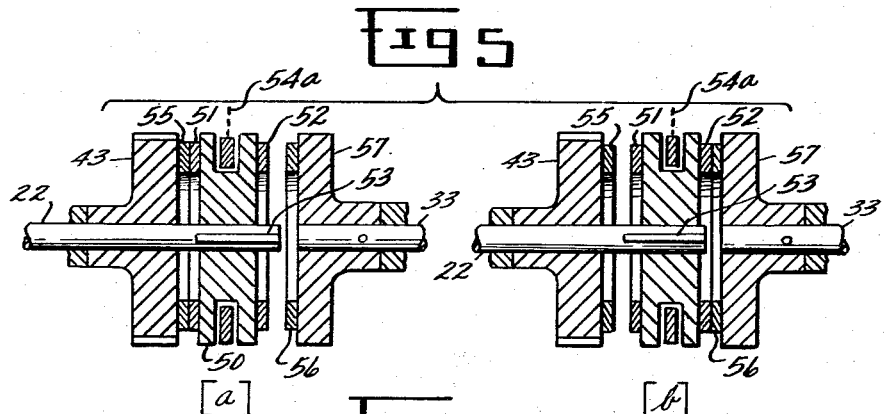
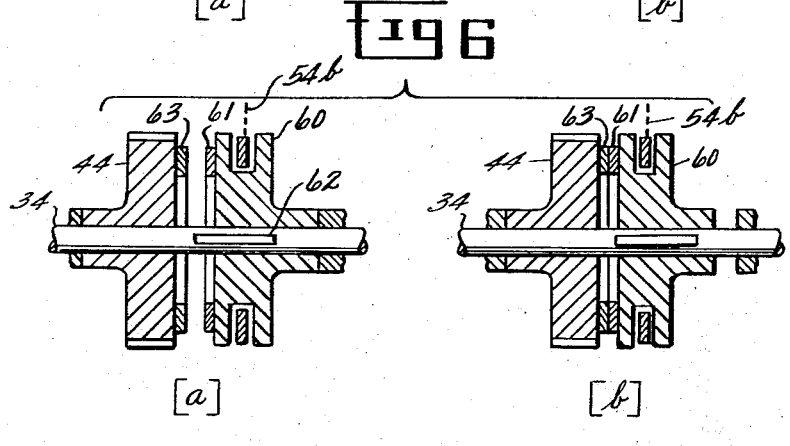
INVENTOR.
WILLIAM B. GIST, JR.
BY
George R. Powers
ATTORNEY

United States Patent Office 3,358,441
Patented Dec. 19, 1967

3,358,441
EFFICIENT PART POWER GAS TURBINE
POWERPLANT
William Bruce Gist, Jr., Lynnfield, Mass., assignor to
General Electric Company, a corporation of New York
Filed July 11, 1966, Ser. No. 564,362
9 Claims. (Cl. 60—39.15)

This invention relates to a gas turbine powerplant capable of effective operation throughout a broad range of power requirements and, more particularly, to a gas turbine powerplant that is highly efficient when operating in a sustained manner at part power levels substantially below the maximum attainable power level.

A gas turbine powerplant, as other prime movers, must be capable of operating effectively throughout a normal range of operating conditions. For the most part, specific fuel consumption is a significant operating parameter which, for effective operation, should be maintained at a relatively low level under all sustained operating conditions and, to the extent possible, under transient conditions. As used herein, "specific fuel consumption" is defined to be the rate of fuel consumption per unit of power produced by the engine, expressed as pounds of fuel per hour per horsepower $$\frac{lb.}{hr./H.P.}$$

In other words, specific fuel consumption is a direct indication of fuel economy. Gas turbine engines normally operate most efficiently, i.e., have lowest specific fuel consumption, at or near their maximum power levels. For applications in which operation is normally maintained at relatively high power levels under all operating conditions, the theoretically available fuel economy will be generally realized in service. Where this is the case, modern gas turbine engines are highly competitive on a fuel economy basis with other types of powerplants and, because of their many other desirable qualities, are often selected to provide power for such applications. Gas turbine engines are thus widely used for propelling aircraft, normal or cruise power requirements for aircraft propulsion being a relatively high percentage of peak power requirements. As power output is reduced, however, specific fuel consumption rises rapidly and becomes prohibitively high at relatively low power levels, such as 10% to 40% of full power output. Because of this poor fuel economy at part power, gas turbine engines have not been used extensively in the past for applications requiring transient peak power levels much higher than normal sustained power levels. This has been, of course, an unfortunate situation since many other characteristics of gas turbine engines, such as relatively high power to weight ratios, simplicity, reliability, and relatively low noise and vibration levels among other characteristics, would be ideal for many such applications, including certain military land vehicles and marine craft.

It is therefore an object of this invention to provide an improved gas turbine powerplant capable of operating effectively throughout a broad range of power requirements.

Another object of this invention is to provide a gas turbine powerplant capable of efficient part power operation.

A further object is to provide a gas turbine powerplant capable of operating efficiently at part power levels as low as 10% to 40% of full power output.

A still further object of this invention is to provide in a gas turbine powerplant the above efficiency characteristics without sacrificing other desirable characteristics of gas turbine engines.

Briefly stated, in carrying out the invention in one form, a gas turbine powerplant is comprised of primary gas turbine means including a primary power turbine; secondary gas turbine means including a secondary compressor, a secondary combustor, and a secondary power turbine; power output means; and power transmission means operable in either of two distinct modes of operation. In the first or low power mode of transmission operation, the primary power turbine is directly connected to the power output means to supply power thereto and the secondary gas turbine means is inoperative. In the second or high power mode of operation, the primary power turbine is connected to the secondary compressor to drive the secondary compressor and the secondary power turbine is connected to the power output means to supply power thereto. The elements comprising the powerplant are sized such that the full load power output of the secondary power turbine is substantially greater than the full load power output of the primary power turbine. In other words, by operating in the low power mode of transmission operation, the powerplant may provide part power for a sustained period of time with the primary gas turbine means operating at or near its most efficient power level. If desired, the part power efficiency may be further enhanced by regeneration. For power output levels greater than the full load power output of the primary power turbine, the secondary gas turbine means is brought into operation in the high power mode of transmission operation to provide the required power output with at least moderate fuel economy.

By further aspects of the invention, the power transmission means includes clutch means and gear means for interconnecting the gas turbine elements in the manner required for operation in each of the first and second modes of transmission operation.

While the novel features of this invention are set forth with particularity in the appended claims, the invention, both as to organization and content, will be better understood and appreciated, along with other objects and features thereof, from the following detailed description when taken in conjunction with the drawings, in which:

FIG. 1 is a schematic illustration of a gas turbine powerplant incorporating the present invention, the power transmission being shown in its first or low power mode of operation;

FIG. 2 is a view of the secondary turbine means taken along viewing line 2—2 of FIG. 1;

FIG. 3 is a view of the power transmission taken along viewing lines 3—3 of FIG. 1 illustrating the first or low power mode of operation;

FIG. 4 is a view similar to FIG. 3 illustrating the power transmission in its second or high power mode of operation; and FIGS. 5 and 6 are detailed views of the clutch means utilized in the power transmission.

Referring now to FIG. 1, a gas turbine powerplant 10 constructed in accordance with the present invention is illustrated, the powerplant 10 including primary gas turbine means 11, secondary gas turbine means 12, power transmission means 13, and power output means 14. In the description which follows, these basic powerplant components 11–14 and their interrelationships will be described in detail, after which the manner by which the present invention provides highly efficient part power operation in combination with satisfactory operation at higher power levels will be appreciated.

The primary gas turbine means 11 comprises a primary compressor 17 including a rotor 17a, a primary combustor 18, a primary gas generator turbine 19 including a rotor 19a, a shaft 20 interconnecting the rotors 17a and 19a to drive the compressor rotor 17a at the same rotary speed as the gas generator turbine rotor 19a, and a primary power turbine 21 including a rotor 21a having a shaft 22 secured thereto for rotation therewith. The compressor 17, the combustor 18, the gas generator turbine 19, and the power turbine 21 are interconnected in serial flow relationship and are designed to provide highly efficient operation when operating or at near the full power output level of the primary power turbine 21, which is approximately fifty percent of the full power output level of the overall powerplant 10. To provide this highly efficient operation, the rotating components of the illustrated primary gas turbine means are of the highly efficient axial flow type; to further enhance the specific fuel consumption, a heat exchanger or recuperator 23 is provided for extracting energy from the exhaust products discharged from the power turbine 21 to preheat combustion air. This heat exchanger 23 will be described in detail at a later point in this specification.

As best illustrated by FIGS. 2 and 3, the secondary gas turbine means 12 comprises a serial flow arrangement a secondary compressor 30 of the single stage, centrifugal flow type, a secondary combustor 31, and a secondary power turbine 32 of the single stage, radially inward flow type. The compressor 30 and the power turbine 32 have shafts 33 and 34, respectively, connected thereto for rotation therewith. The components of the secondary gas turbine means are designed and sized such that the secondary power turbine 32 is capable of producing the full power output of the overall powerplant 10. The secondary gas turbine means operates, however, only when power levels in excess of the maximum power level of the primary power turbine 21 are required. Since the powerplant 10 is intended primarily to operate at relatively low power levels, the secondary gas turbine means 12 is normally inoperative and, as such, represents dead weight which must be carried in order to provide the reserve high power capability. With respect to the secondary gas turbine means 12, weight is thus a more critical characteristic than specific fuel consumption since relatively inefficient operation is acceptable during the occasional and brief periods of high power operation. Accordingly, the rotating components of the illustrated secondary gas turbine means are of the relatively lightweight radial inflow and outflow type, though the invention is not restricted to these specific types of secondary components if greater full-load fuel economy is desired.

In accordance with the present invention, the power transmission means 13 has two distinct modes of operation, a first mode of operation for relative low power operation and a second mode of operation for high power operation. More particularly, under normal operating conditions where the load power requirements are less than the power output capability of the primary gas turbine means 11, the power transmission means 13 directly interconnects the shaft 22 of the primary power turbine 21 and the power output means 14 to transmit power thereto. In this first mode of operation, the power transmission means 13 does not engage either the secondary compressor shaft 33 or the secondary power turbine shaft 34 and, as noted previously, the secondary gas turbine means 12 is therefore inoperative. For higher power operation when the load power requirements are greater than the power output capability of the primary gas turbine means 11, the transmision means 13 interconnects the shaft 22 of the primary power turbine 21 and the shaft 33 of the secondary compressor 30 such that the primary gas turbine means 13 operates, in essence, as a prime mover for driving the compressor 30. In addition, in this second mode of operation, the power transmission means 13 interconnects the shaft 34 of the secondary power turbine 32 and the power output means 14 to supply the load power requirements.

The illustrated power transmission 13 is shown schematically in its first mode of operation by FIGS. 1 and 3 and in its second mode of operation by FIG. 4.

More particularly, the power output means 14, which may be connected through an output shaft 40 to drive a land or marine vehicle or other load not shown, has an input shaft 41 to which a gear 42 is secured for rotation therewith at all times, the gear 42 meshing at all times with pinion gears 43 and 44 mounted for rotation about the axes of the shaft 22 and the shaft 34, respectively. A clutch arrangement provided in accordance with the present invention secures the gear 43 to the shaft 22 for rotation therewith during the first mode of operation. During the second mode of operation, the gear 43 is free to rotate with the gear 42 independently of the shaft 22. Similarly, the gear 44, which is free to rotate with the gear 42 independently of the shaft 34 during the first mode of operation, is secured to the shaft 34 during the second mode of operation. In addition to selectively securing the gears 43 and 44 to the shafts 22 and 34, respectively, the clutch arrangement of this invention also interconnects the shaft 22 and the shaft 33 during the second mode of operation such that the compressor 30 is driven by the power turbine 21.

The clutch arrangement of this invention in one form includes, as best shown by FIGS. 3–5, a clutch plate 50 having first and second friction surfaces 51 and 52 thereon, the clutch plate 50 being connected to the shaft 22 by axial splines 53. When the clutch plate 50 is positioned axially as viewed in FIGS. 3 and 5(a) by suitable actuation means indicated generally by numeral 54a, the friction surface 51 engages a similar surface 55 formed integrally on the gear 43. As a result, the shaft 22 supplies power through the gears 43 and 42 to the power output means 14. In this low power mode of operation, the friction surface 52 is spaced from and transmits no power to a mating surface 56 formed integrally on a clutch element 57 secured to the secondary compressor shaft 33. In the high power mode of operation, as viewed in FIGS. 4 and 5(b), the actuation means 54a moves the friction surface 52 into engagement with the surface 56 such that the secondary compressor 30 is driven from the shaft 22. In this mode of operation, the friction surfaces 51 and 55 are not in engagement and the power output means 14 is therefore not driven directly by the primary turbine means 11.

The clutch arrangement of this invention also includes, as best shown by FIGS. 3, 4, and 6, a clutch plate 60 having a single friction surface 61 thereon, the clutch plate 60 being connected to the shaft 34 by axial splines 62. In the low power mode of operation as illustrated by FIGS. 3 and 6(a), the clutch plate 60 is positioned by suitable actuation means 54b with the friction surface 61 spaced axially from a mating surface 63 on the gear 44 such that no power is transmitted therethrough. In the high power mode of operation, as illustrated by FIGS. 4 and 6(b), the friction surfaces 61 and 63 are engaged so that the secondary power turbine 30 can drive the power output means 14.

The actuation means 54a and 54b referred to above are preferably part of the same general actuation system which may, of course, assume various suitable forms. It is essential that the means 54a and 54b operate in unison at all times in the manner described above.

To enhance specific fuel consumption during normal, or low power, operation, the heat exchanger or recuperator 23 is utilized for extracting energy from the exhaust products discharged from the power turbine 21 to preheat combustion air. In construction, the heat exchanger 23 includes a first set of fluid flow passages 70 extending between first and second headers 71 and 72 respectively. A duct 73 directs compressed air from the primary compressor 17 to the first header 71 and a duct 74 supplies heated air from the second header 72 to the primary combustor 18. A duct 75 directs hot exhaust products to a second set of fluid flow passages 76 in heat exchange relationship with the first set of passages 70, from which the cooled gases are discharged through an exhaust opening 77. In this manner, highly efficient operation is attained since heat energy which would otherwise be wasted is extracted from the exhaust products. If desired, the heat exchanger 23 could be designed to accept compressed air from the secondary compressor 30 instead of, or in addition to, the primary compressor air flow with significant reduction in high power fuel economy but with little increase in regenerator size or weight since regenerator volumes are primarily determined by hot side considerations. Furthermore, the heat exchange apparatus may take on other forms within the teaching of the present invention, the other forms including rotary or intermittent types in which the hot and cold gases alternately flow over the same heat exchange surfaces.

In addition to the fuel economy aspects, the present invention has certain advantages in terms of transient power response rates since there is no shaft connection between the secondary compressor 30 and the secondary power turbine 32. As a result, the speed of the secondary power turbine 32 is not dependent on the speed of the secondary compressor 30. Also, the power output means 14 is driven by a free turbine at all power levels, the result being a variable relationship between power and speed with relatively little effect upon fuel economy.

It will thus be appreciated that this invention provides an improved gas turbine powerplant capable of operating effectively throughout a broad range of power requirements, including highly efficient operation at part power levels as low as 10% to 40% of full power output.

It will be understood that the invention is not limited to the specific details of the construction and arrangement of the particular embodiment illustrated and described herein. In particular, it will be obvious to those skilled in the art that various elements such as the gear train and the clutch arrangement may take on different forms within the teaching of the present invention. It is therefore intended to cover in the appended claims all such changes and modifications which may occur to those skilled in the art without departing from the true spirit and scope of the invention.

What is claimed as new and is desired to secure by Letters Patent of the United States is:

1. A gas turbine powerplant comprising:
   primary gas turbine means including a primary power turbine,
   secondary gas turbine means including a secondary compressor, a secondary combustor, and a secondary power turbine serially arranged in fluid flow relationship,
   power output means,
   and power transmission means having first and second modes of operation,
   said power transmission means in said first mode of operation interconnecting said primary power turbine and said power output means to transmit power from said primary gas turbine means to said power output means,
   and said power transmission means in said second mode of operation interconnecting said primary power turbine and said secondary compressor to drive said secondary compressor and interconnecting said secondary power turbine and said power output means to transmit power from said secondary gas turbine means to said power output means.

2. A gas turbine powerplant as defined by claim 1 in which the elements comprising said powerplant are sized such that the full load power output of said secondary power turbine is substantially greater than the full load power output of said primary power turbine, whereby said gas turbine powerplant has a relatively low range of power output capability with said power transmission means in said first mode of operation and a relatively high range of power output capability with said power transmission means in said second mode of operation.

3. A gas turbine powerplant as defined by claim 2 in which said primary gas turbine means includes a primary compressor, a primary combustor, a primary gas generator turbine for driving said primary compressor, and said primary power turbine; said gas turbine powerplant further comprising heat exchange means for transferring heat energy from exhaust products discharged from at least one of said primary and secondary power turbines to compressed air discharge from at least one of said primary and secondary compressors, whereby highly efficient operation of said gas turbine powerplant is attained.

4. A gas turbine powerplant as defined by claim 2 in which said primary gas turbine means includes a primary compressor, a primary combustor, a primary gas generator turbine for driving said primary compressor, and said primary power turbine; said gas turbine powerplant further comprising:
   a heat exchanger having a plurality of sets of fluid flow passages disposed in heat exchange relationship,
   means including a first set of said heat exchange passages interconnecting said primary compressor and said primary combustor for delivering compressed air to said primary combustor,
   and means including a second set of said heat exchange passages connected to said primary power turbine for discharging exhaust products therefrom to atmosphere,
   whereby heat energy may be transferred from exhaust products in said second set of heat exchange passages to compressed air in said first set of heat exchange passages to provide highly efficient operation of said primary gas turbine means.

5. A gas turbine powerplant as defined by claim 2 in which said power transmission means comprises:
   a first shaft connected to said primary power turbine for rotation therewith,
   a second shaft connected to said secondary compressor for rotation therewith,
   a third shaft connected to said secondary power turbine for rotation therewith,
   gear means connected to said power output means,
   and clutch means,
   said clutch means in the first mode of transmission operation positively interconnecting only said first shaft and said gear means to transmit power from said primary power turbine to said power output means through said gear means,
   and said clutch means in the second mode of transmission operation positively interconnecting said first shaft and said second shaft to drive said secondary compressor and positively interconnecting said third shaft and said gear means to transmit power from said secondary power turbine to said power output means through said gear means.

6. A gas turbine powerplant as defined by claim 2 in which said power transmission means comprises:
   a first shaft connected to said primary power turbine for rotation therewith,
   a second shaft coaxial with said first shaft connected to said secondary compressor for rotation therewith,
   a third shaft connected to said secondary power turbine for rotation therewith,
   gear means connected to said power output means,
   said gear means including a first gear member mounted for rotation about the axis of said first and second shafts and a second gear member mounted for rotation about the axis of said third shaft,
   and clutch means,
   said clutch means in the first mode of transmission operation positively interconnecting only said first shaft and said first gear member to transmit power from said primary power turbine to said power output means through said gear means,
   and said clutch means in the second mode of transmission operation positively interconnecting said first shaft and said second shaft to drive said secondary compressor and positively interconnecting said third shaft and said second gear member to transmit power from said secondary power turbine to said power output means through said gear means.

7. A gas turbine powerplant as defined by claim 6 in which said clutch means comprises:
a first clutch element slidably secured to said first shaft for rotation therewith, said first clutch element being axially movable along said first shaft between first and second positions,
a second clutch element formed integrally with said first gear member,
a third clutch element secured in a fixed axial position to said second shaft for rotation therewith,
said first clutch elements in said first position engaging said second clutch element to transmit power thereto and in said second position engaging said third clutch element to transmit power thereto,
a fourth clutch element slidably secured to said third shaft for rotation therewith, said fourth clutch element being axially movable between first and second positions,
a fifth clutch element formed integrally with said second gear member,
said fourth clutch element in said second position engaging said fifth clutch element to transmit power thereto,
and means for moving said first and fourth clutch elements simultaneously between said first and second positions,
whereby said power transmission means operates in said first mode when said first and fourth clutch elements are simultaneously positioned in said first positions and in said second mode when said first and fourth clutch elements are simultaneously positioned in said second positions.

8. A gas turbine powerplant as defined by claim 7 in which said primary gas turbine means includes a primary compressor, a primary combustor, a primary gas generator turbine for driving said primary compressor, and said primary power turbine, said gas turbine powerplant further comprising:
a heat exchanger having a plurality of sets of fluid flow passages disposed in heat exchanger relationship,
means including a first set of said heat exchange passages interconnecting said primary compressor and said primary combustor for delivering compressed air to said primary combustor,
and means including a second set of said heat exchange passages connected to said primary power turbine for discharging exhaust products therefrom to atmosphere,
whereby heat energy may be transferred from exhaust products in said second set of heat exchange passages to compressed air in said first set of heat exchange passages to provide highly efficient operation of said primary gas turbine means.

9. A gas turbine powerplant as defined by claim 7 in which said primary gas turbine means includes a primary compressor, a primary combustor, a primary gas generator turbine for driving said primary compressor, and said primary power turbine; said gas turbine powerplant further comprising:
a heat exchanger having a plurality of sets of fluid flow passages disposed in heat exchange relationship,
means including a first set of said heat exchange passages interconnecting said secondary compressor and said secondary combustor for delivering compressed air to said secondary combustor,
and means including a second set of said heat exchange passages connected to said primary power turbine for discharging exhaust products therefrom to atmosphere,
whereby heat energy may be transferred from exhaust products in said second set of heat exchange passages to compressed air in said first set of heat exchange passages to provide highly efficient operation of said gas turbine powerplant.

No references cited.

JULIUS E. WEST, *Primary Examiner.*